(12) United States Patent
Sandhir et al.

(10) Patent No.: US 7,940,650 B1
(45) Date of Patent: May 10, 2011

(54) PEER-AGNOSTIC TCP SOCKET REPLICATION BETWEEN PRIMARY AND SECONDARY ROUTING ENGINES

(75) Inventors: Saurabh Sandhir, Milpitas, CA (US); Manoj Kumar Guglani, Milpitas, CA (US); David S. Wang, Santa Clara, CA (US); Navneet Yadav, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 194 days.

(21) Appl. No.: 12/328,352

(22) Filed: Dec. 4, 2008

Related U.S. Application Data

(60) Provisional application No. 61/110,757, filed on Nov. 3, 2008.

(51) Int. Cl.
 *H04J 3/14* (2006.01)
(52) U.S. Cl. ........ 370/219; 370/331; 370/392; 370/401; 340/2.23
(58) Field of Classification Search .................. None
See application file for complete search history.

(56) References Cited

U.S. PATENT DOCUMENTS

| | | | |
|---|---|---|---|
| 6,665,293 B2 * | 12/2003 | Thornton et al. | 370/352 |
| 6,853,617 B2 | 2/2005 | Watson et al. | 370/218 |
| 7,236,453 B2 | 6/2007 | Visser et al. | 370/219 |
| 7,269,133 B2 | 9/2007 | Lu et al. | 370/219 |
| 7,292,535 B2 | 11/2007 | Folkes et al. | 370/238 |
| 7,417,947 B1 | 8/2008 | Marques et al. | 370/220 |
| 2003/0210694 A1 * | 11/2003 | Jayaraman et al. | 370/392 |
| 2008/0088408 A1 * | 4/2008 | Backman | 340/2.23 |

* cited by examiner

*Primary Examiner* — Chi H. Pham
*Assistant Examiner* — Shick Hom
(74) *Attorney, Agent, or Firm* — Shumaker & Sieffert, P.A.

(57) ABSTRACT

This application describes techniques for peer-agnostic socket replication to implement graceful failover. An exemplary method to enable non-stop routing includes receiving a packet with a first routing engine of a network device having the first routing engine and a second routing engine configured as a backup routing engine, replicating, before processing the packet at a transport layer, the packet to form a replicated packet, sending the replicated packet from the first routing engine to the second routing engine, receiving, at the first routing engine, an acknowledgement from the second routing engine acknowledging reception of the replicated packet, after receiving the acknowledgment, processing the packet at the transport layer of the first routing engine to extract application-layer data and assemble a routing message, and storing the application-layer data from the processed packet in a socket associated with a routing process of the first routing engine.

20 Claims, 5 Drawing Sheets

PEER-AGNOSTIC TCP SOCKET REPLICATION BETWEEN PRIMARY AND SECONDARY ROUTING ENGINES

This application claims the benefit of U.S. Provisional Application No. 61/110,757, filed Nov. 3, 2008, the entire content of which is incorporated herein by reference.

TECHNICAL FIELD

The invention relates to computer networks and, more particularly, to routers that perform a switchover from a primary routing engine to a secondary routing engine.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" by which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing communication session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, for example, the secondary routing control unit assumes the responsibility of forwarding packet flows. During a switchover from the primary routing control unit to the secondary routing control unit, a significant period of time may elapse before the secondary routing control unit reaches a state in which it is able to process and forward packets. For example, the secondary routing control unit may need to reestablish routing communication sessions, e.g., BGP sessions, that were lost when the primary routing control unit failed. During this period, network traffic may be queued or lost.

SUMMARY

In general, this application describes techniques for implementing peer-agnostic socket replication from a primary control unit (e.g., a primary routing engine) to a backup control unit (e.g., a secondary routing engine) using replication of routing communication sessions, such as transmission control protocol (TCP) sockets. In the event of a graceful switchover from the primary control unit to the backup control unit, the communication sessions are maintained and the backup control unit transparently takes control of the communication sessions. Data for the sockets associated with routing communication sessions on the primary routing engine is transparently replicated to the secondary routing engine in real-time prior to any switchover event. The secondary routing engine constructs and maintains sockets so as to mimic the sockets of the primary routing engine. During a switchover, the sockets on the secondary routing engine contain all the information needed to ensure that the connections with the routing peers stay up and need not be reestablished. This information typically includes both any communication data queued in the socket buffer as well as any kernel state data for the connection itself, e.g., any TCP state for instance.

As one example, a network device, such as a router, may have a primary routing engine and a secondary, or back-up, routing engine. During a network communication session, software executing on the primary routing engine allows the secondary routing engine to "snoop" messages exchanged between the primary routing engine and routing peers using TCP sockets. That is, when the router receives data intended for the primary routing engine, the data may first be replicated to the secondary routing engine before the primary routing engine issues an acknowledgement to the peer router. Similarly, when the primary routing engine outputs a message, the output data may first be passed to the secondary routing engine, before being output to the network. In this manner, the secondary routing engine may maintain state information that is equivalent to the primary routing engine at all times. Therefore, when the router switches over from the primary routing engine to the secondary routing engine (for example, in the event of a failover), the secondary routing engine may perform these duties without interruption to routing function and, thus, preventing any routing flaps by the peer routers.

In one embodiment, the invention is directed to a method including the steps of receiving a packet with a first routing engine of a network device having the first routing engine and a second routing engine configured as a backup routing engine, replicating, before processing the packet at a transport layer, the packet to form a replicated packet, sending the replicated packet from the first routing engine to the second routing engine, receiving, at the first routing engine, an acknowledgement from the second routing engine acknowledging reception of the replicated packet, after receiving the acknowledgment, processing the packet at the transport layer of the first routing engine to extract application-layer data and assemble a routing message, and storing the application-layer data from the processed packet in a socket associated with a routing process of the first routing engine.

In another embodiment, the invention is directed to a network device that includes a plurality of interface cards to send and receive packets over a network, a first routing engine and a second routing engine, wherein the first routing engine is configured as a primary routing engine and the second routing engine is configured as a secondary routing engine, a network switch to exchange packets between the first routing engine and the plurality of interface cards, and a switchover module to initialize the first routing engine and the second routing engine and to send a signal to the second routing engine to perform routing duties in the event of a switchover event, wherein the first routing engine comprises a plurality of sockets, wherein each of the plurality of sockets is associated with one of a plurality of communication sessions, and wherein the second routing engine comprises a plurality of replicated socket pairs, wherein each of the plurality of replicated socket pairs corresponds to one of the plurality of sockets of the first routing engine, wherein each of the plurality of replicated socket pairs receives incoming data for the corresponding one of the plurality of sockets and receives outgoing data from the corresponding one of the plurality of sockets.

In another embodiment, the invention is directed to a computer-readable medium containing instructions. The computer-readable medium may be a computer-readable storage medium. The instructions cause a programmable processor to receive a packet with a first routing engine of a network device having the first routing engine and a second routing engine configured as a backup routing engine, replicate, before processing the packet at a transport layer, the packet to form a replicated packet, send the replicated packet from the first routing engine to the second routing engine, receive, at the first routing engine, an acknowledgement from the second routing engine acknowledging reception of the replicated packet, after receiving the acknowledgment, process the packet at the transport layer of the first routing engine to extract application-layer data and assemble a routing message, and store the application-layer data from the processed packet in a socket associated with a routing process of the first routing engine.

The techniques described herein may provide certain advantages. For example, the techniques described herein may provide a network device, such as a router, with the ability to perform graceful switchover between routing engines, thereby achieving non-stop routing. In the event of a switchover, a router implementing these techniques may be able to continue to forward packets without downtime and in a manner that avoid routing session reestablishment, thus avoiding route flapping by peer routers. Similarly, these techniques may enable a router to receive in-service software upgrades without causing route flapping. That is, when a software upgrade is necessary for the router, the secondary routing engine may go offline to receive and install the upgrade while the primary routing engine continues to perform the routing duties, then the secondary routing engine may restart. The primary routing engine may then transfer control to the secondary routing engine, receive and install the upgrade, restart, and regain control from the secondary routing engine.

Moreover, these techniques enable a router to perform non-stop routing transparently to outside network devices. Because no modification to existing communication protocols, such as TCP, is necessary to implement these techniques. In particular, external network devices need not change their behavior in order for a network device to implement these techniques. Additionally, because state replication occurs outside of a transportation layer protocol, such as TCP, the amount of state information of the primary to be replicated in the secondary may be reduced, relative to other failover schemes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
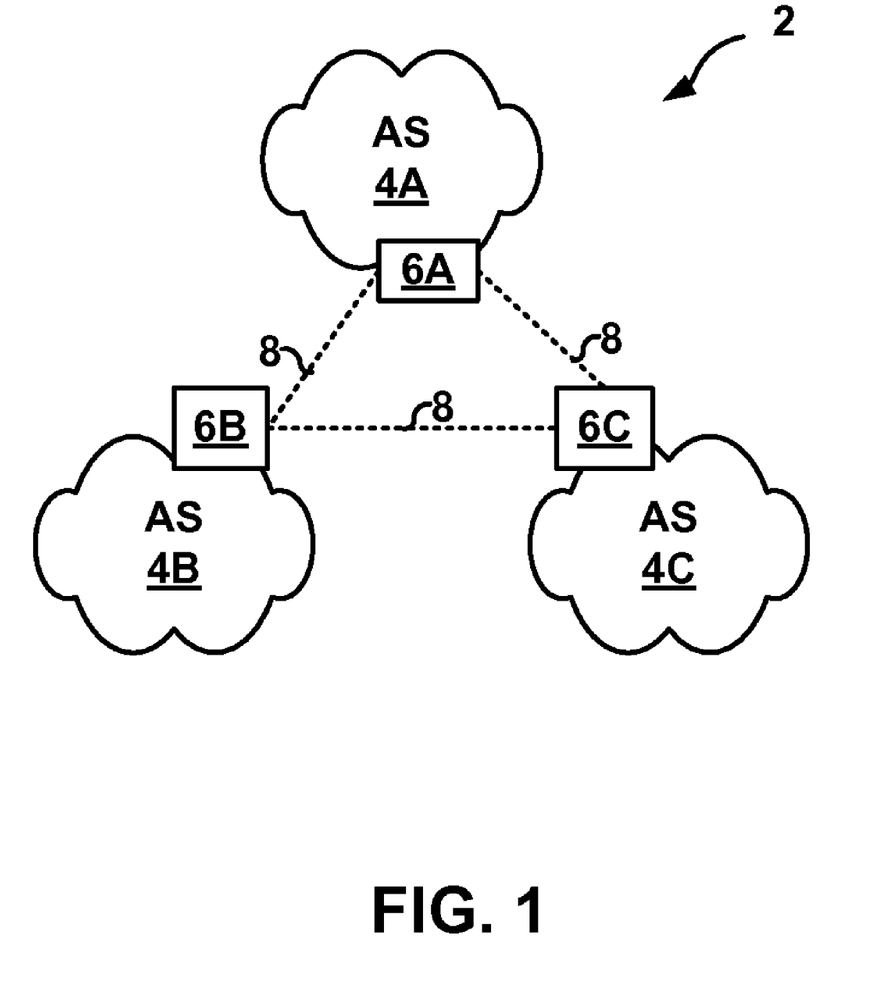
FIG. 1 is a block diagram illustrating an exemplary computing network formed by autonomous systems interconnected by communication links.

FIG. 1 illustrates an exemplary computing network 2 formed by autonomous systems 4A-4C (herein autonomous systems 4) interconnected by communication links 8. Each of autonomous systems 4 represents an independent administrative domain having a variety of networked resources capable of packet-based communication. For example, autonomous systems 4 may include internal networks having servers, workstations, network printers and faxes, gateways, routers, and the like. In this example, autonomous systems 4 include autonomous system border routers (ASBRs) 6 for sharing routing information and forwarding packets via communication links 8. That is, routers 6 maintain peer routing sessions and exchange messages conveying routing information in accordance with a routing protocol, such as the Border Gateway Protocol (BGP). The messages communicated over the routing sessions typically advertise and withdraw routes for reaching destinations within network 2. In the event of a network topology change, such as link failure or failure of one of routers 6, any of the routers detecting the change issue routing messages informing the other routers of the affected routes. In response, routers 6 select new routes for reaching the destinations within network 2.

In order to mitigate the effects on node failure, one or more of routers 6 incorporate a primary routing engine and one or more backup routing engines to assume routing responsibilities in the event the primary routing engine fails. Moreover, as described herein, one or more of routers 6 provide graceful switchover from the primary routing engine to one of the secondary routing engines using replication of routing communication sessions, such as transmission control protocol (TCP) sockets. That is, data for the sockets associated with the routing communication sessions on the primary routing engine is transparently replicated to the secondary routing engine in real-time (i.e., while the primary routing engine exchanges routing messages) prior to any switchover event. The secondary routing engine constructs and maintains communication sockets so as to mimic the sockets currently used by the primary routing engine when communicating with the other routers 6. During a switchover from the primary routing engine to the secondary routing engine, the pre-established sockets on the secondary routing engine contain all the information needed to ensure that the connections with the routing peers stay up and need not be reestablished. This information typically includes both any communication data queued in the socket buffer as well as any kernel state data for the connection itself, e.g., any TCP state, for instance. As described herein, these techniques may be implemented without requiring changes to networking protocols, such as the TCP protocol; in this manner, the techniques provide for peer-agnostic socket replication.

For exemplary purposes, the principles of the invention will be described in reference to router 6A. However, any or all of routers 6B-6C may operate in accordance with the techniques described herein. In this example, router 6A provides non-stop routing by including a primary routing engine as well as one or more standby routing engines (not shown). In the event of a switchover, i.e. when the primary routing engine of router 6A fails or otherwise needs to be shut down, one of the standby routing engines assumes control over routing resources and routing functionality generally. Prior to the switchover, the primary and standby routing engines synchronize their respective state information to allow the standby routing engine to assume control of the router resources without having to relearn state information. Moreover, a corresponding TCP socket is pre-established on the standby routing engine for each TCP socket currently in use by the primary routing engine for routing sessions.

For example, router 6A may engage in a routing session with, e.g., router 6B using a TCP socket. Router 6A and router 6B may exchange routing messages over the TCP socket in accordance with a routing protocol, such as BGP. When router 6A receives a routing message from router 6B, the routing message may be internally forwarded to the primary routing engine of router 6A for processing. Before being fully processed by the primary routing engine and acknowledged, however, the received routing message is replicated and sent to the secondary routing engine of router 6A. Similarly, when router 6A outputs routing messages to router 6B via the TCP socket, the routing message to be sent is replicated and sent to the secondary routing engine. Upon receiving inbound or outbound routing messages, the secondary routing engine updates state information for its TCP socket corresponding to the TCP socket of the primary routing engine used for the communication session. In particular, the primary routing engine of router 6A may send replicated data to the secondary routing engine before the data is processed by a transport layer for the socket on the primary routing engine. For example, data may be replicated and communicated to the backup routing engine before outbound data is packaged into a TCP packet (when sending data) by the transport layer or before an inbound packet is unpacked from a TCP packet (when receiving data) by the transport layer. As further illustrated below, this asymmetric replication of data for routing messages at different levels of the networking stack aids router 6A in ensuring that the state of the corresponding TCP socket on the backup routing engine matches that of the TCP socket of the primary routing engine.

In the event that the primary routing engine of router 6A goes down, for example as a result of a failure or because software of the primary routing engine is to be updated, the secondary routing engine detects the event (e.g., by way of heartbeat signal or explicit message from the primary) and resumes control of all routing functions. Because the secondary routing engine has received all data that the primary routing engine has sent and received, the secondary routing engine may be able to continue the communication session without the necessity of a session restart. This data includes socket data replication (e.g., replication of inbound and outbound data) as well as TCP state synchronization between kernels executing in the different routing engines. For example, the secondary routing engine may keep track of sequence numbers of received packets and received acknowledgements for the corresponding socket. The secondary routing engine may also buffer sent data such that, if the primary routing engine fails at a time when sent data is not received by a peer recipient (as determined by whether the secondary routing engine as received an acknowledgement), the secondary routing engine may retransmit the data after taking control of routing duties. The secondary routing engine may also use TCP auto-update features upon taking control of routing duties for data that is being forwarded.

The described herein may provide certain advantages. For example, router 6A may be able to perform graceful switchover between routing engines, thereby achieving non-stop routing. In the event of a failure or other need to bring down the primary routing engine, router 6A may be able to continue to forward packets without downtime and in a manner that avoid routing session reestablishment, thus avoiding route flapping by peer routers. Similarly, these techniques may enable a router to receive in-service software upgrades without causing route flapping. For example, when a software upgrade is necessary for the router, a system administrator may take the secondary routing engine offline to receive and install the upgrade. Once the software of the secondary routing engine has been upgraded, the state gets replicated to the secondary including, for example, TCP socket states that are associated with routing protocols. Then the primary routing engine may gracefully switch over to the secondary routing engine to upgrade the primary routing engine while the secondary routing engine maintains the routing sessions. After the primary routing engine has updated its software, the secondary routing engine may pass control back to the updated primary routing engine.

Moreover, router 6A may perform TCP socket replication transparently to outside network devices, such as routers 6B-6C, because no modification to existing communication protocols is necessary. Routers 6B-6C need not change their behavior in order for router 6A to implement TCP socket replication and non-stop routing. Because state replication occurs outside of a transportation layer protocol, such as TCP, the amount of state information of the primary routing engine to be replicated in the secondary routing engine may be less than failover or other switchover schemes that are presently known in the art.

Moreover, routers 6B-6C need not have any knowledge of the fact that router 6A is configured to perform switchover. Additionally, the techniques described herein may be applied between a routing engine of router 6A and a routing engine of a second router, such as router 6B. That is, a routing engine of router 6A may act as a primary routing engine, while a routing engine of a second router may act as a secondary or back-up routing engine.

Figure 2:
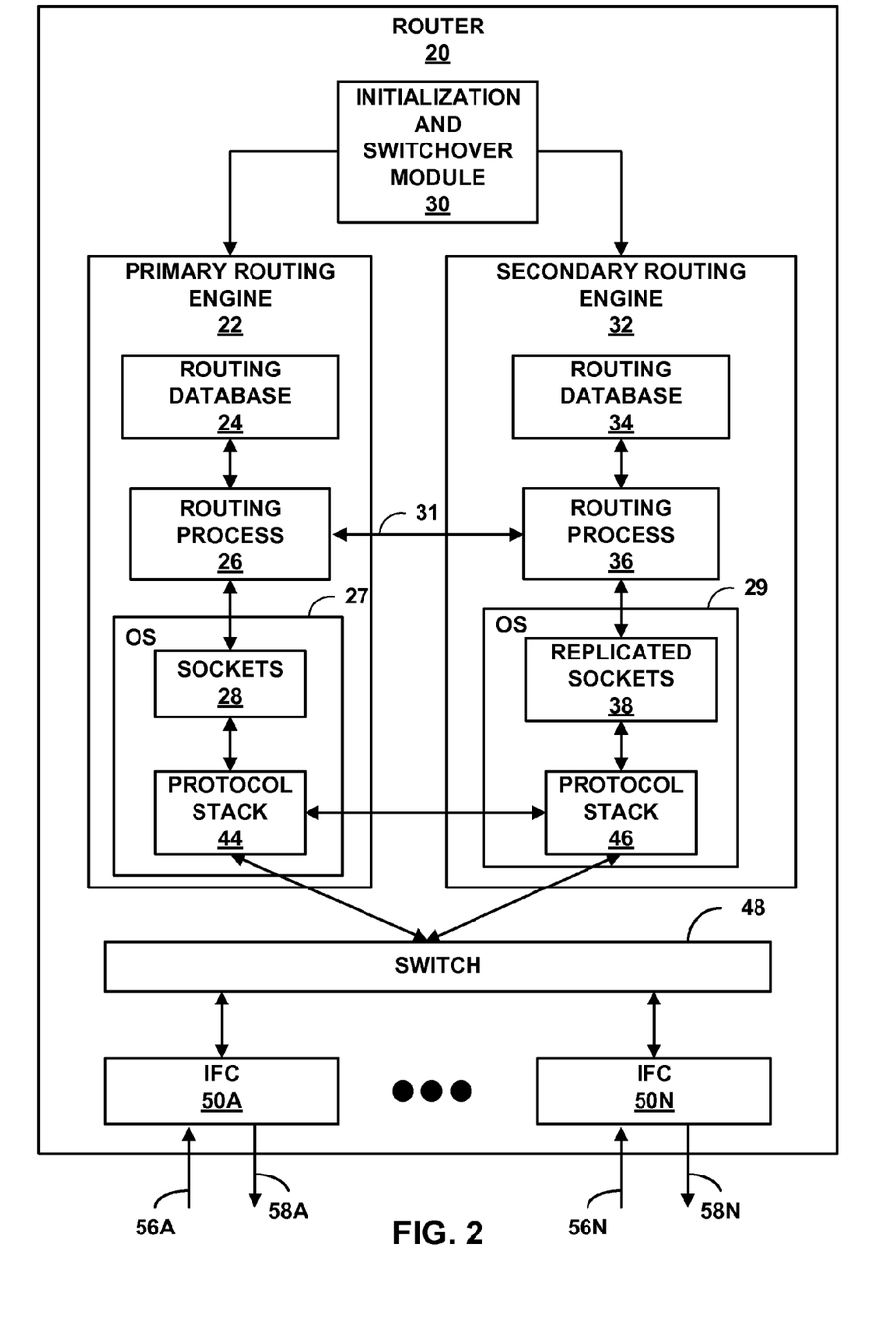
FIG. 2 is a block diagram illustrating an exemplary router capable of performing a switchover from a primary routing engine to a secondary routing engine.

FIG. 2 is a block diagram illustrating an exemplary router 20 capable of performing a graceful switchover from primary routing engine 22 to a secondary routing engine 32 using the techniques described herein. Router 20 may, for example, correspond to router 6A of FIG. 1.

In the exemplary embodiment of FIG. 2, router 20 includes primary routing engine 22 and secondary routing engine 32. In this manner, router 20 may be viewed as having a primary control unit and a backup control unit. Primary routing engine 22 is responsible for maintaining routing database 24 to reflect the current topology of a network and other network entities to which router 20 is connected. That is, primary routing engine 22 provides an operating environment for execution of a routing process (daemon) 26 that implements one or more routing protocols to communicate with peer routers and periodically update routing database 24 to accurately reflect the topology of the network and the other network entities. Example protocols include routing and label switching protocols, such as BGP, mpBGP, IS-IS, OSPF, RIP, RSVP-TE and LDP. In a similar fashion, secondary routing engine 32 provides an operating environment for maintaining routing database 34 in accordance with data received from primary routing engine 22.

In a typical architecture, router 20 includes interface cards (IFCs) 50A-50N ("IFCs 50") that receive packets on inbound links 56A-56N ("inbound links 56") and sends packets on outbound links 58A-58N ("outbound links 58"). IFCs 50 are coupled to primary routing engine 22 and secondary routing engine 32 by high-speed switch 48. In another embodiment, router 20 may be a multi-chassis router in which multiple routing nodes are physically coupled and configured to operate as a single routing node. One example of a multi-chassis router includes multiple line card chassis (LCCs), which include one or more interface cards (IFCs) for sending and receiving packets, and a central switch control chassis (SCC), which provides top-down management of the LCCs. U.S. patent application Ser. No. 11/832,342 filed Aug. 1, 2007, entitled MULTI-CHASSIS ROUTER WITH MULTI-PLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. patent application Ser. No. 11/832,342 filed Aug. 1, 2007 are incorporated herein by reference.

Router 20 also includes initialization and switchover module (ISM) 30, which may also be referred to herein as simply a "switchover module." ISM 30 initializes router 20 to perform packet and data replication between primary routing engine 22 and secondary routing engine 32. ISM 30 may, for example, call procedures of protocol stack 44 of primary routing engine 22 and/or protocol stack 46 of secondary routing engine 32 in order to initialize router 20 for data replication. ISM 30 may also instruct secondary routing engine 32 to take control of routing procedures in case of a switchover or failover. ISM 30 may be implemented as a component separate from primary routing engine 22 and/or secondary routing engine 32 (e.g., by way of a separate controller), or may be implemented as software or other logic within the routing engines.

One or more routing protocols implemented by routing process 26 establish peer routing sessions with other routers and, by way of these network communication sessions, exchange routing messages. As such, an operating system 27 executing within primary routing engine 22 implements kernel-level processes for handling data at various layers of the open systems interconnection (OSI) networking model (shown as protocol stack 44). OS 27 provides an API by which routing process 26 creates sockets 28 and establishes, for example, TCP/IP-based communication sessions for sending and receiving routing messages for each socket. Socket 28 are logical constructs having data structures and state data maintained by OS 27 of primary routing engine 22 and may be viewed as acting as interfaces between routing process 26 and protocol stack 44. An example of protocol stack 44 is discussed with respect to FIG. 3.

Secondary routing engine 32 provides an operating environment for execution of routing process 36. Like routing process 26, routing process 36 implements one or more routing protocols and periodically updates routing database 34 to accurately reflect the topology of the network and the other network entities. That is, like routing process 26, routing process 36 sends and receives routing messages through replicated sockets 38, where each of the replicated sockets corresponds to one of sockets 28 currently in use for routing communications. Routing process 36 receives replicated routing messages from primary routing engine 22, updates routing database 34, and outputs routing messages as if it were handling all routing functions for router 20. Replicated sockets 38 of secondary routing engine 32 are logical constructs having data structures and state data maintained by OS 29 and act as an interface between routing process 36 and protocol stack 46, also of secondary routing engine 32. An example of protocol stack 46 is also discussed with respect to FIG. 3.

The two instances of the routing process 26, 36 interact with each other using an out of band communication mechanism 31, such as a dedicated socket for exchanging data and control messages. This mechanism 31 is generally used for initial sync-up of network state and for exchanging replication socket handles allocated by the underlying operating systems.

For example, upon opening a new routing session, routing process 26 interacts with operating system 27 to allocate a new socket and tags the socket (referred to as the "original socket") for replication by an API call to the operating system. The call causes operating system 27 to asynchronously set up the replication communications between protocol stacks 44, 46 as described below. Further, operating system 27 throttles all writes on the socket until the write succeeds, and all inbound application-layer data is buffered but not exposed to the application until replication is acknowledged, as discussed below. The socket handle returned by the operating system is passed by the routing process 26 to routing process 36 via the out of band communication channel 31. Routing process 26 use this handle to invoke a socket split procedure by OS 29 to obtain a socket descriptor pair (referred to as "Replicated Socket Pair"). In the replicated socket pair, one descriptor identifies a first replicated socket (replicated rcv socket) that is used by OS 29 to mimic the original socket's receive buffer and the other descriptor corresponds to a second replicated socket (replicated snd socket) used to mimic the original socket's send buffer.

After the replication has been initiated by the primary routing process 26, on the receive side of the original socket buffer, any data that is currently unread and any data that is received henceforth is replicated to the replicated rcv socket of the secondary routing process 36. On the send side (i.e., outbound side), only data subsequently sent (i.e., written to the original socket) will be replicated to the replicated snd socket of the secondary routing process 36. More specifically, at the time replication is initiated, routing processes 26, 36 exchange control message to initiate replication for a particular socket handle, control message to exchange socket options and TCP state for the socket, message to replicate any data currently in the original socket's rcv socket buffer, and control message to replicate any unacknowledged data in the original socket's snd socket buffer. The messages may be exchanged in the form of a request followed by an acknowledgement.

In general, when router 20 receives inbound data destined for primary routing engine 22, e.g. a TCP/IP packet received from link 56A of IFC 50A that has a destination IP address matching that of the primary routing engine, the packet is transferred to primary routing engine 22 through switch 48. Protocol stack 44 provides a hierarchy of software layers that processes the packets. After processing the data at lower levels of the stack but before the data at the transport layer with respect the TCP elements of the packet, components within protocol stack 44 replicate the packet and send the replicated packet to protocol stack 46 of secondary routing engine 32. In one embodiment, protocol stack 44 may send the replicated packet to protocol stack 46 in the form of an IP packet over a dedicated internal network interconnect. Protocol stack 44 may also wait for an acknowledgment from protocol stack 46 of reception of the replicated packet, before processing the TCP portion of the packet and advancing the packet up the software stack.

Upon receipt of the packet, protocol stack 46 of secondary routing engine 32 sends an acknowledgement of reception to protocol stack 44, at which point protocol stack 44 continues to process the packet through the upper portions of the protocol stack including the transport layer and above. Protocol stack 46 may then send the replicated packet to routing process 36 via replicated sockets 38. In one embodiment, for each peer communication session, replicated sockets 38 may include a send socket and a receive socket (as shown in, e.g., FIG. 3). Protocol stack 46 may push data that has been received from one of IFCs 50 to the receive socket of replicated sockets 38.

As protocol stack 44 completes processing the inbound packet, operating system 27 associates the packet with an appropriate one of sockets 28, typically raising an event or flag to indicate to routing process 26 that inbound data has been received on the socket and is ready to be de-queued for processing. In one embodiment, this may occur concurrently with protocol stack 46 associating the replicated packet with a corresponding one of replicated sockets 38 for communication to routing process 36. Upon de-queuing application-layer data from the inbound socket, routing process 26 processes the communication in accordance with the corresponding routing protocol and updates routing database 24. Routing process 36 similarly de-queues application-layer data from the corresponding inbound socket of replicated sockets 38, processes the application-layer data in accordance with the appropriate routing protocol and updates routing database 34.

Protocol stack 44 also includes components that monitor socket 28 for outbound data received from routing process 26. When routing process 26 pushes application-layer data for a routing protocol to socket 28, protocol stack 44 may retrieve the data from socket 28. Before processing the partitioning the application-layer routing data into one or more TCP packets, upper-level components within protocol stack 44 (i.e., components above the transport level) intercept the application-layer data, replicate the data and send the replicated data to upper-level components within protocol stack 46 of secondary routing engine 32. Protocol stack 44 may wait for an acknowledgement of reception of this replicated data before forming a TCP packet from the data. In some cases, all socket writes from/by the routing process 26 are undertaken only after the routing process sets a record-based write option for the socket. By setting the option, routing process 26 configures the socket to allow for only complete data writes, i.e., the write call is rejected by the socket if space in the socket's buffer is not enough for the entire routing message being output by the routing process. This ensures that the granularity of data replication on send side is a single protocol message (record) and in the event of a failover, there is a clear demarcation of message boundary at which the secondary routing engine 32 needs to resume operations.

When protocol stack 46 receives data sent by routing process 26 of primary routing engine 22, protocol stack 46 replicates the outbound data and pushes the data to a corresponding send socket of replicated sockets 38. In response, protocol stack 46 processes the application-layer data to update various TCP-related state data of protocol stack 46 as if the data were sent out the corresponding replicated send socket. Protocol stack 46 then acknowledges receipt of the data to protocol stack 44 of primary routing engine 22. Upon receiving the acknowledgement from protocol stack 46, protocol stack 44 delivers the outbound data to the transport layer of the stack, which partitions the application-layer routing data to form one or more TCP/IP packet from the data, updates TCP-related state data and outputs the packet(s) to one of IFCs 50 for transmission to the routing peer.

Figure 3:
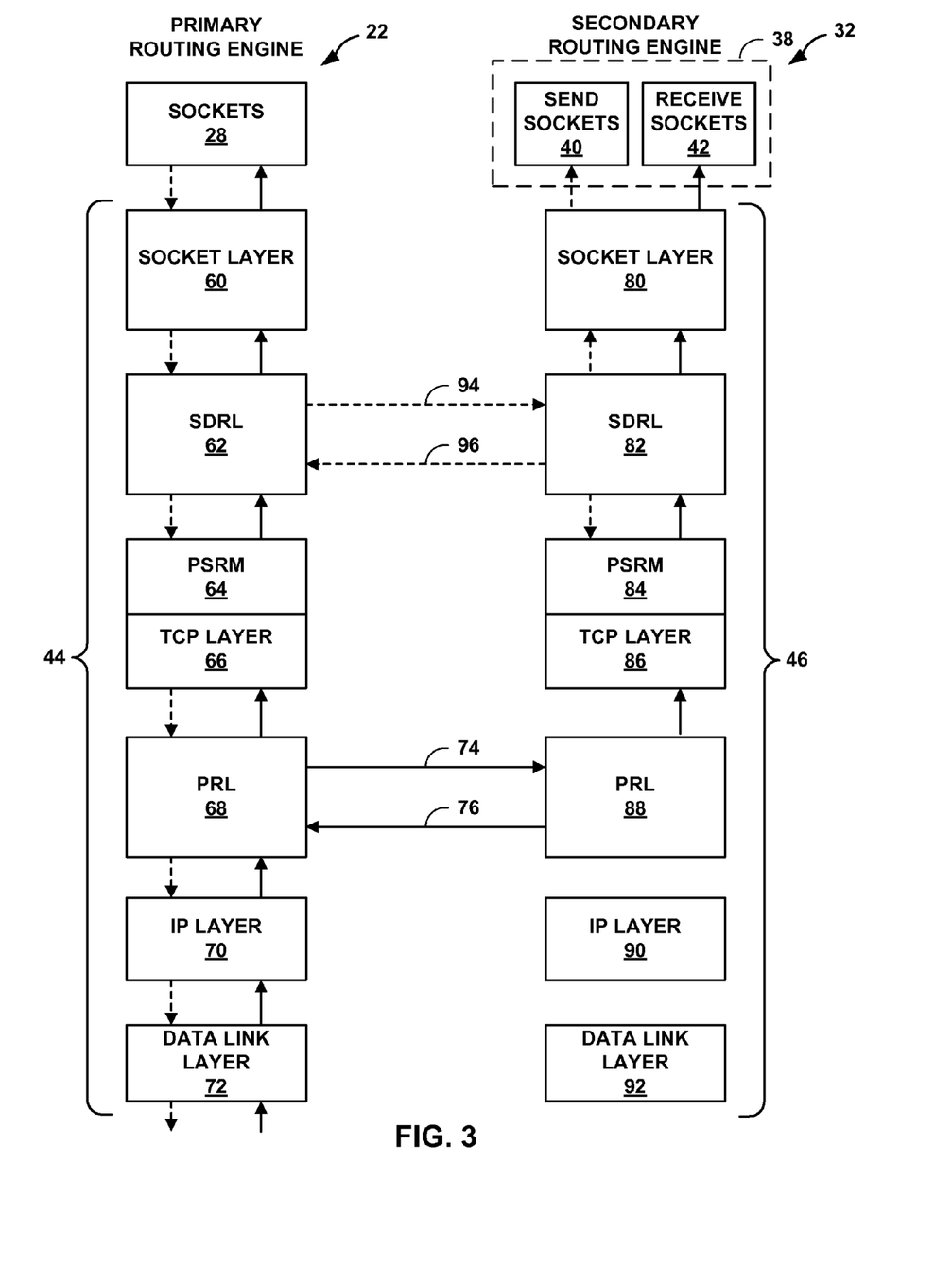
FIG. 3 is a block diagram illustrating an example of a protocol stack of a primary routing engine and a protocol stack of a secondary routing engine.

FIG. 3 is a block diagram illustrating an example of protocol stack 44 of primary routing engine 22 and protocol stack 46 of secondary routing engine 32. Each of protocol stack 44 and protocol stack 46 hierarchically implement various network protocols, such as TCP and IP, at various levels as shown in FIG. 3. FIG. 3 also depicts communication paths of packets received and data sent when primary routing engine 22 is operational. The path of received packets is illustrated by a solid arrow, while the path of sent data is depicted by a dashed arrow.

Although described primarily with respect to TCP, the techniques described herein may be applied to any transport layer protocol, such as UDP or raw IP. Likewise, the techniques described herein may be applied to various Internet layer protocols, such as IPv4 or IPv6. Moreover, although described with respect to protocol stack 44 and protocol stack 46 of router 20 of FIG. 2, it should be understood that, in one embodiment, protocol stack 44 may be on a first router and protocol stack 46 may be on a second router; the first router and the second router may then send communications in accordance with the described techniques using, for example, TCP/IP over a network. In this manner, the primary routing engine and the secondary routing engine need not be present on the same network device.

As shown in FIGS. 2 and 3, secondary routing engine includes replicated sockets 38, which for each TCP connection includes one of sends sockets 40 and one of receive sockets 42. In general, each of send sockets 40 provides an input for receiving outbound application-layer data (i.e., routing messages) that have been sent by primary routing engine 22 and replicated to secondary routing engine 38 for processing as if a passive, peer router. Each of receive sockets 42 provides an input to buffer application-layer data that has been sent to primary routing engine 22 by a peer router and replicated to secondary routing engine by way of PRLs 68, 88. For each routing session maintained by routing process 26 of primary routing engine 22, the corresponding pair of replicated sockets 38 (i.e., on of send sockets 40 and one of receive sockets 42) are read-only to routing process 36 of secondary routing engine 32 and are used by routing process 36 to snoop on the data sent and received by routing process 26 on the original socket, which represent a bi-directional communication session. Routing process 36 of the secondary routing engine 32 reads from these two sockets and keeps its state updated based on the observed routing message exchange between the primary routing engine and the peer router anchoring the other end of the routing communication session.

In general, various layers of protocol stack 44 and protocol stack 46 are implemented similarly to each other and, and some of the layers perform comparable tasks in accordance with the OSI model. For example, data link layer 72 and data link layer 92 each receive and send packets from switch 48 at the data link layer. Data link layer 72 is active when primary routing engine 22 is active, whereas data link layer 92 sends and receives data when secondary routing engine 32 is active, i.e. in the event of a switchover such as a failover. Data link layer 72 sends incoming packets to and receives outgoing packets from IP layer 70. Similarly, data link layer 92 sends incoming packets to and receives outgoing packets from IP layer 90 when secondary routing engine 32 is active.

IP layer 70 is responsible for receiving incoming data from data link layer 72, processing the data, and sending the processed data to packet replication layer (PRL) 68. IP layer 70 receives outgoing data from TCP layer 66, which bypasses PRL 68, processes the data, and passes the data to data link layer 72. When secondary routing engine 32 is active, IP layer 90 receives incoming data from data link layer 92, processes the data, and sends the data to PRL 88, and IP layer 90 receives outgoing data from TCP layer 86, processes the data, and sends the data to data link layer 92.

In order to provide socket replication from the viewpoint of the routing process and to ensure predictable data state on the secondary RE in light of a failover, protocol stacks 44, 46 have been modified to include synchronization points for both data as well as transport state. Moreover, the synchronization points have been structured such that: (i) there is minimal disruption to normal TCP operation from the perspective of both routing processes 26, 36 as well as peer routers, and (ii) the state of both data and transport can be predicted and verified to as large an extent as possible.

As shown in FIG. 3, protocol stacks 44, 46 each include additional layers to the network stack: a socket data replication layer (SDRL) and a packet replication layer (PRL). For example, SDRLs 62, 82 have been inserted below socket layers 60, 80 and above the transport layers, i.e., TCP layers 66, 86, and are responsible for synchronizing, on a per record basis, the outgoing application-layer data (i.e., routing messages) written by routing process 26 of primary routing engine 22 on an original socket for the routing session to the corresponding one of send sockets 40 of the secondary routing engine 32. In addition, PRL 68, 88 have been added to protocol stacks 44, 46 below the transport layer and are primarily responsible for replicating incoming packets to the secondary routing engine in accordance with the techniques described herein. In the example of FIG. 3, PRL 68 and PRL 88 are situated between layers three and four of the OSI model. In addition, protocol state replication modules (PSRM) 64, 84 have been inserted above TCP layers 66, 86 and are responsible for setting up initial TCP state, maintaining the TCP state, and activating TCP communications on the secondary routing engine in the event of failover. PSRM 64 and PSRM 84 may be viewed as shim modules that are located just above layer four of the OSI model.

In addition to the data and state synchronization functions outlined above, enhanced network stacks 44, 46 provide additional flow control over the processing of both inbound and outbound routing messages for a routing session in a manner that considers the state of both the original socket as well as the replicated socket pairs for that session. More specifically, routing process 26 of primary routing engine 22 and routing process 36 of secondary routing engine 32 may process inbound routing messages at different rates. As a result, a scenario may arise where an incoming data segment (e.g., TCP packet) or an outgoing write-record (e.g., routing message) would otherwise be discarded on the secondary routing engine because, for example, insufficient buffer space in the replicated socket pair. This loss of data would otherwise impair the ability of the secondary routing engine to accurately maintain network state and gracefully assume routing functions in the event of a failover. To address these issues, the socket replication systems provided by router 20 and enhanced network stacks 44 implements flow control mechanisms that are guided by the union of the buffer space in the original socket for a routing session on primary routing engine 22 as well as in the corresponding replicated sockets on secondary routing engine 32.

The operation and roles of SDRLs 62, 82, PRLs, 68, 88 and PSRMs 64 and 84 with respect to both data and state replication as well as flow control are described in further detail in the sections that follow. A routing engine, such as routing engine 22, may implement the functionality described with respect to, e.g., PRL 68 in the form of a module, such as an executable software, firmware, or hardware module. Similarly, a routing engine may implement the functionality described with respect to SDRL 62 and PSRM 64 in the form of a module. A routing engine may also incorporate these functions into existing modules.

PSRM 64 may perform an initial setup of TCP layer 66 in response to a direct procedure call by ISM 30 of router 20. In addition, PSRM 64 initializes some TCP state from original socket that needs to be replicated to the secondary routing engine to setup the replicated socket pair on the secondary. For example, when replication is setup, ISM 50 may invoke PSRM 64 to establish initial TCP state for any socket to be replicated. PSRM 84 initializes TCP layer 86 of secondary routing engine 32 in a similar manner upon receiving a message from PSRM 64. In the event of a switchover, PSRM 84 may activate a TCPCB subcommand of TCP layer 86 on secondary routing engine 32 such that secondary routing engine 32 may resume routing duties that were performed by primary routing engine 22.

When routing process 26 creates a new socket for a routing session, socket layer 60 creates a corresponding socket structure. Once the TCP session is established with the peer, routing process may enable socket replication on this socket. This will initiate setting up of SDRL, PSRM and PRL layers for the socket. SDRL 62 acts as an interface to call the transport layer (e.g., PSRM 64 and TCP layer 66) and transparently invokes PSRM 64.

As discussed above, PRL 68, 88 are added to protocol stacks 44, 46 below the transport layer and operate in accordance with the techniques described herein to replicate incoming packets to the secondary routing engine. In this example, PRL 68 and PRL 88 are situated between layers three and four of the OSI model. In general, PRL 68 may perform two basic tasks: flow control and data replication. PRL 68, along with PRL 88, is responsible for determining available buffer space in each of sockets 28 and receive sockets 42.

When data is received from switch 48, PRL 68 determines whether both the corresponding one of sockets 28 and its counterpart one of receive sockets 42 have enough space in their respective buffers to receive the data. In one embodiment, PRL 88 may keep track of the available buffer capacity of receive sockets 42 and PRL 68 may issue a query to PRL 88 to determine the amount of buffer capacity for a particular one of receive sockets 42. PRL 68 may determine the available buffer capacity as the minimum of the buffer capacities of receive socket 42 and socket 28. When the incoming data for one of sockets 28 exceeds the determined buffer capacity for either that socket or the sockets counterpart one of replicated receive sockets 42, PRL 68 may issue a command to drop the data, or to trim the data if possible, e.g. in accordance with the TCP protocol. This ensures that packet drops occur in a consistent manner across both the primary routing engine 22 and the backup routing engine 32. That is, this ensure that a packet dropped at one TCP layer for one of the routing engines is not accepted at the TCP layer of the other routing engine due to, for example, a race condition. In the event that either the TCP buffers for either the original one of sockets 28 or the corresponding one of replicated receive sockets 42 is full, PRL 68 modifies any window advertisement from TCP layer 66 for the original socket so as to advertise a window size of zero. Further, PRL 68 modifies any window advertisement from TCP layer 66 so as to ensure that the advertised window is always less than or equal to the lower of the current receive buffer space of the original one of sockets 28 receive buffer space and the current receive buffer space of the corresponding one of replicated receive sockets 42

On the other hand, when incoming data is less than the minimum buffer space currently available for both the original one of sockets 28 and the corresponding one of replicated receive sockets 42, PRL 68 replicates the incoming TCP packets and sends the replicated TCP packets 74 to PRL 88. PRL 88 may send acknowledgement message 76 to PRL 68 to acknowledge receipt of replicated TCP packets. After incoming TCP packets have been replicated and acknowledged, the TCP packets are pushed up protocol stack 44 and protocol stack 46 in parallel. That is, PRL 68 may receive acknowledgement 76 and then push the packet to TCP layer 66. PRL 88 may concurrently push replicated packet to TCP layer 86.

After PRL 68 and PRL 88 have replicated and acknowledged a received TCP packet, the received packet is passed up through each of protocol stack 44 and protocol stack 46 and is processed according to the required protocols. That is, each of the higher levels of each respective protocol stack may buffer and process the packet in accordance with implementations of the associated protocols at those levels. For example, TPC layer 66 may process received TCP packets so as to remove TCP headers and re-assemble higher-level data units, such as application-layer data. Primary routing engine 22 receives the assembled application-layer data through an interface associated within the particular one of sockets 28 with which the data is associated. Routing process 26 processes the application-layer data in accordance with the particular routing protocol. Routing process 36 executing on secondary routing engine 32 may similarly receive replicated application-layer data (e.g., routing messages) on the corresponding one of receive sockets 42 and process routing messages to update routing database 34. In other words, routing process 36 of secondary routing engine 32 processes the routing messages so as to keep track of the current state of the network with respect to routing topology. This allows secondary routing engine 32 to maintain current internal state so that it is able to resume routing operations quickly in response to a switchover event.

As discussed above, socket data replication layers (SDRLs) 62, 82 are added to the protocol stacks 44, 45 in accordance with the techniques described and are responsible for replicating outgoing application-layer data (i.e., routing messages) written by routing process 26 on an original socket to the corresponding one of send sockets 40 of the secondary routing engine 32. In one example, SDRL 62 and SDRL 82 are positioned between layers four and five of the OSI model. Like PRLs 68, 88, SDRLs 62, 82 also have roles to play in flow control as well as data replication.

When primary routing engine 22 is sending data, SDRL 62 receives application-layer data from one of sockets 28 and plays an active role in replication of data prior to the outbound data being processed by the transport layer of protocol stack 44. For example, SDRL 62 replicates the outbound application-layer data (e.g., routing message) and sends replicated data 94 to SDRL 82. At this time, SDRL 82 may determine whether the original one of sockets 28 has sufficient buffer space to store the original data as well as determine whether the corresponding one of send sockets 40 has sufficient buffer space to store the replicated data 94.

For example, when send socket 40 has sufficient buffer space SDRL 82 may pass the replicated data up to socket layer 80 to write the replicated data to send socket 40. SDRL 82 may also acknowledge receipt of the data by sending acknowledgement 96 to SDRL 62. In addition, SDRL 82 may send messages to SDRL 62 with respect to changes in the size of the buffers of send socket 40 and receive socket 42 in order to implement flow control. When send socket 40 does not have sufficient buffer space, SDRL 62 rejects the write call to the socket from routing process 26. SDRL 62 may, for example, receive an explicit rejection message from SDRL 82.

In one embodiment, sockets 28 may be implemented or configured such that socket 28 will only receive complete data writes. That is, where socket layer 60 attempts to write data to socket 28 that exceeds the available buffer space in socket 28, socket 28 may reject the entire data write, as opposed to accepting a portion of the data write and rejecting the rest. Send socket 40 and receive socket 42 be similarly configured. In this manner, there may be a clear message boundary for secondary router engine 32 to resume routing operations in the case of a switchover.

In some cases, SDRL 82 and socket layer 80 may be configured to control send sockets 40 so as to buffer sent data until the network peer router to which the data was originally sent has acknowledged reception thereof. When the peer router sends an acknowledgement of reception, the acknowledgement is replicated and sent to secondary routing engine 32 via PRLs 68, 88 in accordance with the techniques described herein. When TCP layer 86 of secondary routing engine 32 receives the acknowledgement of received data, the send socket 40 may remove the corresponding sent data from the buffer. In this manner, if a switchover occurs before the sent data reaches the peer, secondary routing engine 32 may retransmit the data by extracting the data from send socket 40 and sending the data to the peer.

Similarly, receive socket 42 stores replicated received application-layer data (e.g., routing messages) until primary routing engine 22 has processed the data and issued a response. The response may be replicated by SDRL 62 and sent to secondary routing engine 32. When secondary routing engine 32 receives a response to data in receive socket 42, secondary routing engine 32 may store the response in send socket 40 and clear the corresponding received data from receive socket 42 after the data is completely processed by routing process 36. In this manner, if a switchover occurs before primary routing engine 22 has a chance to respond to the received data, secondary routing engine 32 may issue a response to the received data stored in receive socket 42.

In the event of a switchover from primary routing engine 22 to secondary routing engine 32, protocol stack 46 become fully active and assume full routing responsibilities. To achieve a switchover, in one embodiment, switchover module 30 may activate a TCPCB of PSRM 84. For example, switchover module 30 may initialize the TCPCB with timers or other control features for TCP and direct PSRM 84 to become active. Switchover module 30 may perform a switchover from primary routing engine 22 to secondary routing engine 32 when, for example, primary routing engine 22 fails or when primary routing engine 22 must be brought down in order to install a software update for primary routing engine 22.

In general, in the event of a switchover, PRL 88 and SDRL 82 may become passive, in one embodiment, so as to pass through calls and data without modification or interference. That is, PRL 88 and SDRL 82 may stop receiving replicated data and merely pass data between the other layers of protocol stack 46, as described herein. In one embodiment, a router may further include a tertiary or even greater number of back-up routing engines (not shown), in which case, in the event of a switchover, PRL 88 and SDRL 82 switch from receiving replicated data to replicating data for the other back-up routing engines. Further, upon restart of primary routing engine 22, the primary routing engine may assume a backup role and PRL 88 and SDRL 82 may replicate outbound routing messages and inbound packets to protocol stack 44.

After a switchover, the other layers of protocol stack 46 operate in a conventional manner. For example, data link layer 92 sends and receives data to and from switch 48. Data link layer 92 may process incoming data from switch 48 to obtain data units and pass the data units to IP layer 90 for formulation of IP packets. Likewise, when data link layer 92 receives an outbound IP packet from IP layer 90, data link layer 92 may process the packet for transmission through switch 48 as one or more data units. IP layer 90 passes inbound IP packets through PRL 88 to TCP layer 86 and receives outgoing packets from TCP layer 86 through PRL 88. TCP layer 86 receives inbound IP packets from IP layer 90 through PRL 88 and processes the incoming packets to assemble application-layer data for communication to socket layer 80 through SDRL 82. TCP layer 86 may also receive outgoing application-layer data from socket layer 80 through SDRL 82 for partitioning into TCP packet(s) and delivery to IP layer 90.

After switchover, socket layer 80 selects one of either send sockets 40 or receive sockets 42 for use as a socket for all inbound and outbound communications for the routing session. Alternatively, socket layer 80 may utilize a distinct socket (i.e., a newly allocated socket) as a socket for the routing session. In another embodiment, socket layer 80 may use each of send sockets 40 and receive sockets 42, treating the sockets as half-duplex sockets. Socket layer 80 may also determine whether there exists data in send socket 40 that has not been acknowledged by a corresponding recipient. Socket layer 80 may further determine whether there exists data in receive socket 42. Socket layer 80 may inform routing process 36 as to the existence of such data in send socket 40 and receive socket 42. Routing process 36 may also take control of the routing duties for router 20.

When data exists in receive socket 42, routing process 36 may process the data to determine the destination, e.g. by examining routing database 34, and forward the data to its destination. When data exists in send socket 40, routing process 36 may await an acknowledgement of receipt of the data; if an acknowledgement is not received in accordance with the TCP protocol, routing process 36 may resend the data. In this manner, secondary routing engine 32 may resume routing duties for router 20 in the event of a switchover from primary routing engine 22 to secondary routing engine 32.

Figure 4:
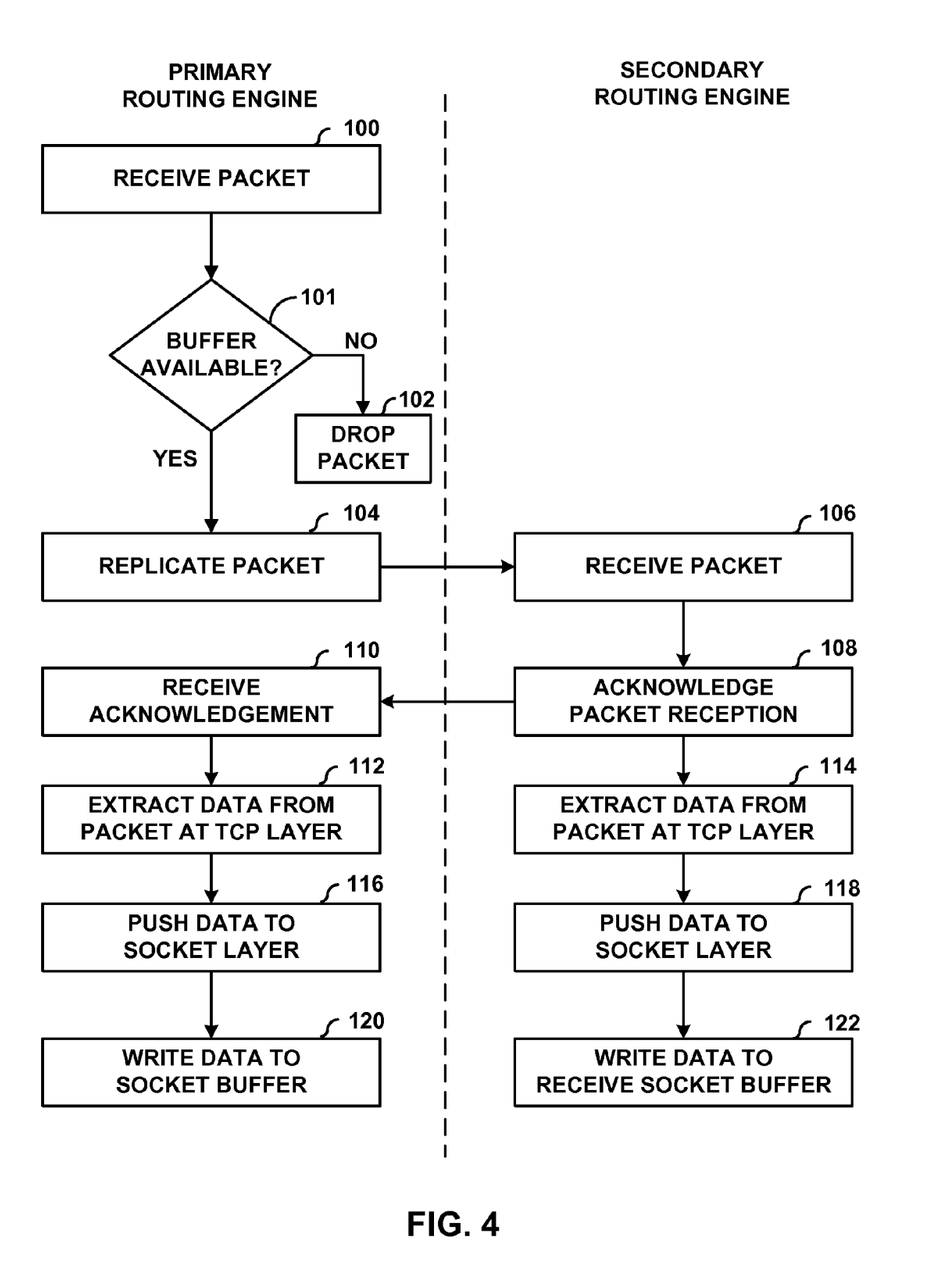
FIG. 4 is a flowchart illustrating an exemplary method for receiving a packet when a primary routing engine is active.

FIG. 4 is a flowchart illustrating an exemplary method for receiving an inbound packet when primary routing engine 22 is active. Initially, switch 48 passes one or more data units from one of IFCs 50 to data link layer 72 of primary routing engine 22 (100). Data link layer 72 process the layer two (L2) data units (e.g., frames) and passes the data units to IP layer 70. IP layer 70 may process L2 data units to assemble IP packets and passes the IP packet up protocol stack 44 to PRL 68.

PRL 68 then performs a PCB lookup to associate the IP packet with a TCPCB so as to identify the relevant socket. If the TCPCB matches a socket tagged for replication, PRL 68 replicates the IP packet to peer PRL 88, as discussed further below. By replicating the IP packet at this early stage prior to the transport layer, the techniques ensure that the input TCP state for both protocol stacks 44, 46 stay in sync without requiring explicit TCP state update messages be exchanged between the protocol stacks. After replication of the IP packet, the original IP packet and its duplicate move through the two peer protocol stacks 44, 46 in parallel updating the TCP state as they pass through the TCP layers 70, 90. In this way, TCP state for the protocol stacks (e.g., sequence numbers, acknowledgements, window size and any meta data) are derived separately and independently by both stacks but nevertheless remain synchronized.

Prior to replication, PRL 68 implements flow control by determining how much space is available in the original one of sockets 28 and the corresponding one of receive sockets 42. PRL 68 then determines whether there is sufficient buffer capacity in both socket 28 and receive socket 42 to receive the incoming packet (101). In one embodiment, PRL 68 may charge PRL 88 with the task of determining the available buffer capacity of receive socket 42; accordingly, PRL 68 and PRL 88 may negotiate to determine whether there is sufficient buffer capacity to receive the packet. When the newly received packet will exceed the buffer space in either the original one of socket 28 or the corresponding replicated one of receive sockets 42 ("NO" branch of 101), PRL 68 drops the packet (102). In this manner, PRL 68 may ensure that primary routing engine 22 and secondary routing engine 32 maintain the same state information, in that neither primary routing engine 22 nor secondary routing engine 32 will receive the packet when only one of the two cannot receive the packet.

When there is sufficient buffer capacity in socket 28 and receive socket 42 to receive the packet ("YES" branch of 101), PRL 68 replicates the packet and sends replicated packet 74 (e.g., in the form of a replication request encapsulating the replicated packet) to PRL 88 (104). PRL 88 may receive the packet (106) and then send acknowledgement 76 to PRL 68, to acknowledge receipt of the replicated packet (108). In one embodiment, PRLs 68, 88 embed information conveying their respective TCP current buffer sizes within the packet replication request and the acknowledgement. This resolves any potential race condition that may arise with respect to the TCP buffers. The lower of the two specified buffer sizes are used by PRLs 68, 88 as a common view of socket state for controlling whether the original packet and the replicated packet are accepted or dropped.

Once PRL 68 has received acknowledgement 76 from PRL 88 (110), PRL 68 passes the IP packet up to TCP layer 66

(112). Concurrently, PRL 88 may pass the replicated IP packet up to TCP layer 86 (114). TCP layer 66 process the packet (112) and passes application-layer data extracted from the packet (or multiple TCP packets) to socket layer 60 (116), where the application-layer data is processed and ultimately pushed to socket 28 (120). Similarly, TCP layer 86 processes the replicated IP packet (114) and passes application-layer data extracted from the replicated packet(s) up protocol stack 46 through SDRL 82 to socket layer 80 (118), where the replicated packet may be processed and ultimately passed to receive socket 42 (122).

Figure 5:
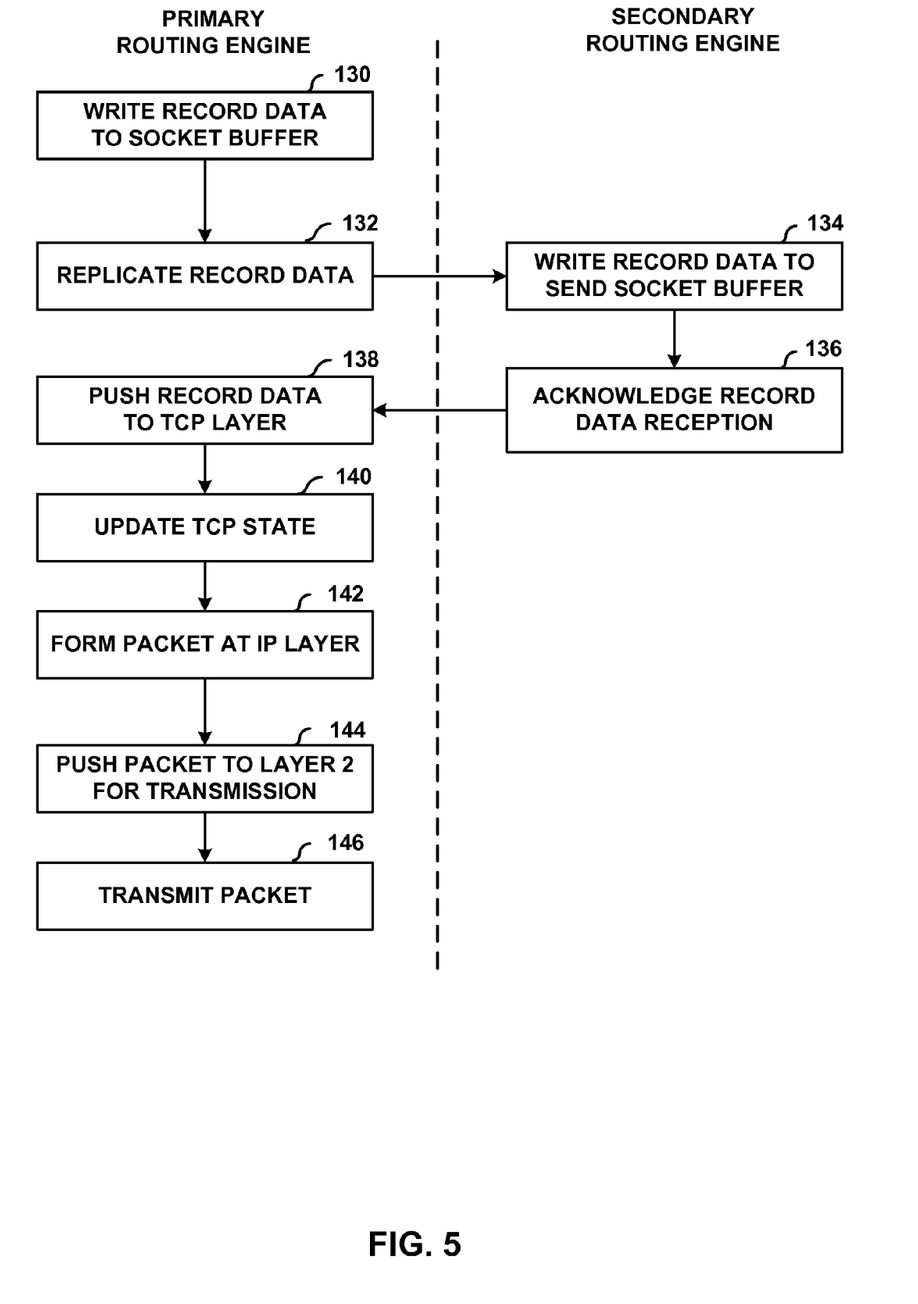
FIG. 5 is a flow chart illustrating an exemplary method for sending data when a primary routing engine is active.

FIG. 5 is a flow chart illustrating an exemplary method for sending data when a primary routing engine is active. Initially, routing process 26 writes a routing protocol message (e.g., a BGP update message) in the form of application-layer data to one of sockets 28, i.e., the socket corresponding the particular routing session for which the routing message is being output (130). When the socket has data available for sending, socket layer 60 retrieves the application-layer data from socket 28 and process the application-layer data by passing the data to SDRL 62. SDRL 62, in turn, replicates the application-layer data and send a copy of the routing message as replicated data 94 to SDRL 82 (132). SDRL 82 sends the replicated data up to socket layer 80, which associates the replicated data with a corresponding one of send sockets 40 so as to make the outbound routing message to the secondary routing protocol process 36 (134). SDRL 82 may also send the replicated data, or portions thereof, down to PSRM 84 so that PSRM 84 may maintain state information for TCP layer 86, e.g., updating the snd_nxt and snd_up values within the corresponding TCPCB. SDRL 82 may also acknowledge receipt of replicated data 94 by sending acknowledgement 96 to SDRL 62 (136). Step (132)-(136) may be optimized by piggybacking multiple outbound routing protocol messages (records) into one replication and coalescing acknowledgements using a delayed acknowledgement mechanism in which the acknowledgement is delayed for a period of time until no more replication messages are received.

Upon receiving acknowledgement 96 from SDRL 82, SDRL 62 pushes the application-layer data down to TCP layer 66 and processed by the lower-layers of the protocol stack in accordance with their normal operation (138). PSRM 64 updates TCP state information within the sockets TCPCB on the primary routing engine based on information received from SDRL 62 (140). TCP layer 66 receives the outbound application-layer data, in light of the updated state information, to form one or more TCP packets. TCP layer 66 passes the TCP packet(s) to IP layer 70 (transparently through PRL 68) for output as IP packets (142). IP layer 70 passes the IP packets to data link layer 72 (144), which in turn may output the packet to switch 48 (146).

Methods described herein may be performed in hardware, software, firmware, or any combination thereof. For example, methods described herein may be performed by an application specific integrated circuit (ASIC). Methods described herein may also be embodied in a computer readable medium containing instructions. Instructions embedded in a computer readable medium may cause a programmable processor, or other processor, to perform the method, e.g. when the instructions are executed. A computer readable medium may be a computer readable storage medium. Computer readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other computer readable media.

Various embodiments of the invention have been described. These and other embodiments are within the scope of the following claims.

The invention claimed is:

1. A method comprising:
   receiving a packet with a first routing engine of a network device having the first routing engine and a second routing engine, wherein the first routing engine is configured as a primary routing engine and the second routing engine is configured as a backup routing engine;
   replicating, before processing the packet at a transport layer, the packet to form a replicated packet;
   sending the replicated packet from the first routing engine to the second routing engine;
   receiving, at the first routing engine, an acknowledgement from the second routing engine acknowledging reception of the replicated packet;
   after receiving the acknowledgment, processing the packet at the transport layer of the first routing engine to extract application-layer data and assemble a routing message;
   storing the application-layer data from the processed packet in a socket associated with a routing process of the first routing engine; and
   switching over from the first routing engine to the second routing engine.

2. The method of claim 1, wherein switching over comprises:
   sending a signal to the second routing engine to perform routing on incoming packets;
   receiving a packet; and
   sending the packet to the second routing engine for routing of the packet.

3. The method of claim 1, wherein switching over comprises:
   receiving, with the second routing engine, a signal to perform routing;
   receiving, with the second routing engine, a packet;
   performing, with the second routing engine, a route lookup on the packet to determine a destination for the packet; and
   forwarding, with the second routing engine, the packet to the destination.

4. The method of claim 1, wherein switching over is performed by a switchover module when the switchover module detects a failure of the first routing module.

5. The method of claim 1, wherein switching over is performed by a switchover module when the switchover module detects an update for the first routing module.

6. The method of claim 1, further comprising:
   performing a route lookup on the application-layer data to determine a destination for the application-layer data;
   preparing responsive data to be sent to the destination;
   replicating, before processing the responsive data at the transport layer, the responsive data;

sending the replicated responsive data to the second routing engine;

receiving an acknowledgement from the second routing engine at the first routing engine of reception of the replicated responsive data;

processing the responsive data at the transport layer of the first routing engine to create a packet; and transmitting the created packet with the first routing engine to the destination.

7. The method of claim 6, wherein replicating, before processing the packet at a transport layer, the packet comprises replicating the packet before processing the packet at the transmission control protocol (TCP) layer, and wherein replicating, before processing the responsive data at the transport layer, the responsive data comprises replicating the responsive data before processing the responsive data at the TCP layer.

8. The method of claim 6, further comprising storing, with the second routing engine, the replicated responsive data in a first socket of a replicated socket pair.

9. The method of claim 1, further comprising storing, with the second routing engine, the replicated packet in a second socket of a replicated socket pair.

10. A network device comprising:

a plurality of interface cards to send and receive packets over a network;

a first routing engine and a second routing engine, wherein the first routing engine is configured as a primary routing engine and the second routing engine is configured as a secondary routing engine;

a network switch to exchange packets between the first routing engine and the plurality of interface cards; and a switchover module to initialize the first routing engine and the second routing engine and to send a signal to the second routing engine to perform routing duties in the event of a switchover event, wherein the first routing engine comprises a plurality of sockets, wherein each of the plurality of sockets is associated with one of a plurality of routing communication sessions with peer routers, and wherein the second routing engine comprises a plurality of replicated socket pairs, wherein each of the plurality of replicated socket pairs corresponds to one of the plurality of sockets of the first routing engine, wherein each of the plurality of replicated socket pairs of the second routing engine includes a first socket to receive a copy of incoming data intended for the corresponding one of the plurality of sockets of the first routing engine and a second socket to receive a copy of outgoing data from the corresponding one of the plurality of sockets of the first routing engine.

11. The network device of claim 10, further comprising a first protocol stack executed by the first routing engine comprising a packet replication layer below a transport layer of the first protocol stack and a socket data replication layer above the transport layer, wherein the first routing engine is configured to maintain routing information and to send and receive data through the first protocol stack in accordance with the routing information, wherein the packet replication layer replicates incoming packets and transmits the replicated packets to the second routing engine prior to transmitting the corresponding incoming packets to the transport layer of the protocol stack processing the packet, and wherein the socket data replication layer replicates outbound application-layer data and transmits the outgoing application-layer data to the second routing engine prior transmitting the corresponding outgoing application-layer data to the transport layer of the protocol stack processing the outbound application-layer data.

12. The network device of claim 11, wherein the second routing engine comprises a second protocol stack having a packet replication layer below a transport layer of the second protocol stack, and a socket data replication layer above the transport layer;

wherein the packet replication layer of the second protocol stack receives replicated packets from the packet replication layer of the first protocol stack, confirms reception of the replicated packets to the packet replication layer of the first protocol stack, and passes the replicated packet up the second protocol stack, wherein the socket data replication layer of the second protocol stack receives replicated outbound application-layer data from the socket data replication layer of the first protocol stack, passes the replicated outbound application-layer data up the second protocol stack, and confirms reception of the replicated data to the socket data replication layer of the first protocol stack.

13. The network device of claim 10, wherein the switchover module monitors the first routing engine to detect a failure of the first routing engine and, when the switchover module detects a failure of the first routing engine, the switchover module sends the signal to the second routing engine.

14. The network device of claim 10, wherein at least one of the plurality of replicated socket pairs comprises a send socket to receive the outgoing data from the corresponding one of the plurality of sockets and a receive socket to receive the incoming data intended for the corresponding one of the plurality of sockets.

15. The network device of claim 10, further comprising a protocol state replication module executed by the first routing engine to initialize the first routing engine and to manage state information.

16. A non-transitory computer-readable medium comprising instructions for causing a programmable processor to:

receive a packet with a first routing engine of a network device having the first routing engine and a second routing engine, wherein the first routing engine is configured as a primary routing engine and the second routing engine is configured as a backup routing engine;

replicate, before processing the packet at a transport layer, the packet to form a replicated packet;

send the replicated packet from the first routing engine to the second routing engine;

receive, at the first routing engine, an acknowledgement from the second routing engine acknowledging reception of the replicated packet;

after receiving the acknowledgment, process the packet at the transport layer of the first routing engine to extract application-layer data and assemble a routing message;

store the application-layer data from the processed packet in a socket associated with a routing process of the first routing engine; and switch over from the first routing engine to the second routing engine.

17. The non-transitory computer-readable medium of claim 16, further comprising instructions to:

receive, with the second routing engine, a switchover signal;

receive a packet with the second routing engine;

perform a route lookup on the packet with the second routing engine to determine a destination for the packet; and forward, with the second routing engine, the packet to the destination.

18. The non-transitory computer-readable medium of claim 17, further comprising instructions to detect a failure of the first routing engine and to detect an update for the first routing module and, in response, to send the switchover signal with the first routing engine.

19. The non-transitory computer-readable medium of claim 16, further comprising instructions to store the replicated packet in a first socket of a replicated socket pair of the second routing engine.

20. The non-transitory computer-readable medium of claim 16, further comprising instructions to store application-layer data in a second socket of a replicated socket pair of the second routing engine.

* * * * *